US012773779B2

(12) United States Patent
Wahrburg et al.

(10) Patent No.: US 12,773,779 B2
(45) Date of Patent: Oct. 27, 2026

(54) REDUCING KINEMATIC ERROR

(71) Applicant: ABB Schweiz AG, Baden (CH)

(72) Inventors: Arne Wahrburg, Weiterstadt (DE); Richard Roberts, Gilching (DE); Stig Moberg, Västerås (SE); Nima Enayati, Mannheim (DE)

(73) Assignee: ABB Schweiz AG, Baden (CH)

( * ) Notice: Subject to any disclaimer, the term of this patent is extended or adjusted under 35 U.S.C. 154(b) by 29 days.

(21) Appl. No.: 18/948,710

(22) Filed: Nov. 15, 2024

(65) Prior Publication Data

US 2025/0065498 A1 Feb. 27, 2025

Related U.S. Application Data

(63) Continuation of application No. PCT/EP2022/063354, filed on May 17, 2022.

(51) Int. Cl.
*B25J 9/16* (2006.01)

(52) U.S. Cl.
CPC .......... *B25J 9/1641* (2013.01); *B25J 9/1653* (2013.01)

(58) Field of Classification Search
None
See application file for complete search history.

(56) References Cited

U.S. PATENT DOCUMENTS

2011/0173496 A1* 7/2011 Hosek .................... G07C 3/00 714/26
2017/0057095 A1* 3/2017 Oestergaard ............ B25J 19/06
2020/0180153 A1 6/2020 Tsuboi
2020/0180154 A1 6/2020 Tsuboi
2021/0146536 A1 5/2021 Okuno

FOREIGN PATENT DOCUMENTS

EP 0522411 A1 * 1/1993 ........... B25J 9/1692
JP 2015-6705 A 1/2015

OTHER PUBLICATIONS

Mitchell R. Woodside, Joseph Fischer, Patrick Bazzoli, Douglas A. Bristow, Robert G. Landers, A Kinematic Error Controller for Real-Time Kinematic Error Correction of Industrial Robots, Procedia Manufacturing, vol. 53, 2021 (Year: 2021).*
Giovannitti, E., Nabavi, S., Squillero, G. et al. A virtual sensor for backlash in robotic manipulators. J Intell Manuf 33, 1921-1937 (2022) (Year: 2022).*
European Patent Office, International Search Report in International Patent Application No. PCT/EP2022/063354, 5 pp. (Jan. 9, 2023).
European Patent Office, Written Opinion in International Patent Application No. PCT/EP2022/063345, 9 pp. (Jan. 9, 2023).

* cited by examiner

*Primary Examiner* — Jason Holloway
*Assistant Examiner* — Bryant Tang
(74) *Attorney, Agent, or Firm* — Whitmyer IP Group LLC

(57) ABSTRACT

A method includes determining a movement of a robot arm in which a joint while being rotated from a start angle to an end angle, is subject to a constant gravity-induced torque; controlling execution of the movement, and, in the movement, controlling the joint to rotate from the start angle to the end angle at a constant speed; detecting speed fluctuations of the joint while it is being rotated from the start angle to the end angle; and estimating the kinematic error based on the speed fluctuations.

11 Claims, 2 Drawing Sheets

REDUCING KINEMATIC ERROR

CROSS-REFERENCE TO RELATED APPLICATIONS

The instant application claims priority to International Patent Application No. PCT/EP2022/063354, filed May 17, 2022, which is incorporated herein in its entirety by reference.

FIELD OF THE DISCLOSURE

The present disclosure generally relates to systems and methods for reducing kinematic error when controlling the movement of a joint in an articulated robot arm.

BACKGROUND OF THE INVENTION

An articulated robot arm comprises a plurality of links, which are coupled to each other, to a base or to an end effector by rotatable joints. Rotation of such a joint is driven by a motor, typically via a transmission gear. Play and inaccuracy in the manufacture of the motors and gears affects the accuracy with which the position and the speed of an end effector at the distal end of the robot arm can be controlled. Harmonic drive gears are widely used as transmission gear in robots, since they are practically backlash-free and achieve high reduction ratios. However, inevitable inaccuracies, such as eccentricity of a gearwheel or spline, would still cause the rotation speed of a joint to fluctuate even if its motor could be driven at a perfectly constant speed, so that the position of the joint can deviate from what one would expect based on knowing the position of the motor and the reduction ratio of the gear. This deviation is commonly referred to as kinematic error or transmission error.

BRIEF SUMMARY OF THE INVENTION

The present disclosure describes a simple and cost efficient way of assessing and compensating kinematic error in a robot joint. In one aspect, the disclosure describes a method for assessing kinematic error in a joint which rotatably connects a proximal portion and a distal portion of a robot arm, the robot joint having associated with it a motor mounted in one of said portions and coupled to the other one of said portions for driving rotation of the joint by a transmission gear, and a sensor for measuring the rotation of the joint, the method comprising the steps of:

(a) determining a movement of the robot arm in which the joint, while being rotated from a start angle to an end angle, is subject to a constant gravity-induced torque;
(b) controlling execution of said movement, and, in said movement, controlling the joint to rotate from the start angle to the end angle at a constant speed;
(c) detecting speed fluctuations of the joint while it is being rotated from the start angle to the end angle; and
(d) estimating the kinematic error based on the speed fluctuations.

By keeping the gravity-induced torque constant, it can be ensured that speed fluctuations are indeed due to imperfections of the gear, or, at least, are not biased by gravity-induced deformation of the robot arm.

BRIEF DESCRIPTION OF THE SEVERAL VIEWS OF THE DRAWING(S)

DETAILED DESCRIPTION OF THE INVENTION

Figure 1:
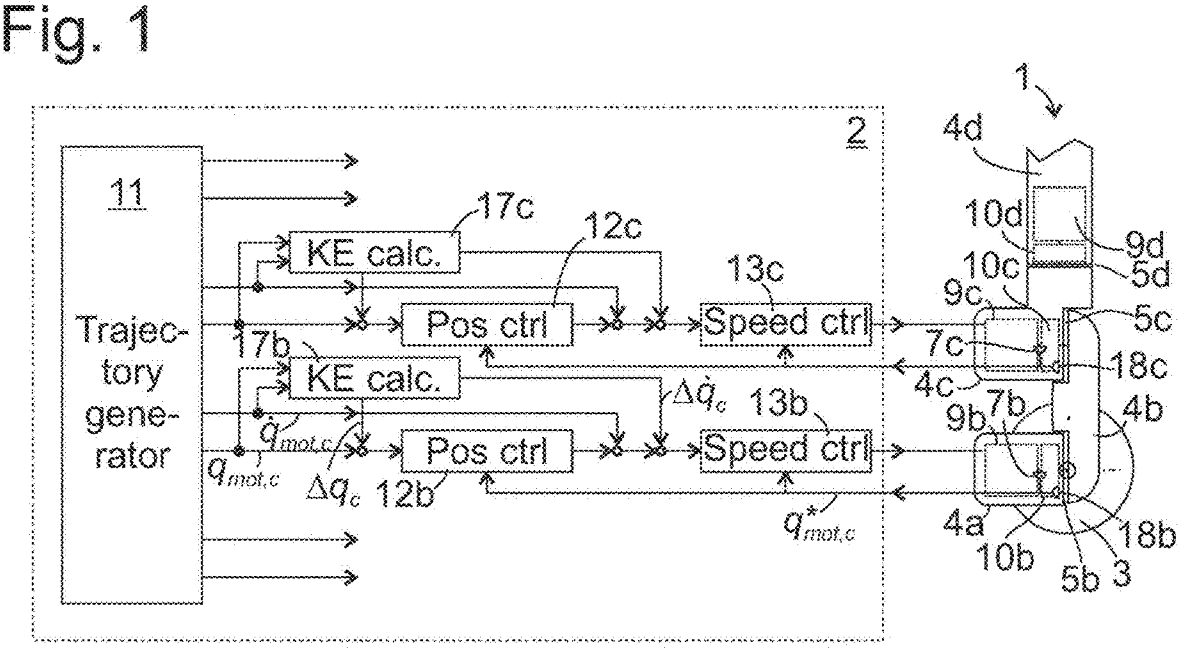
FIG. 1 is a block diagram of a robotic system in accordance with the disclosure.
Figure 2:
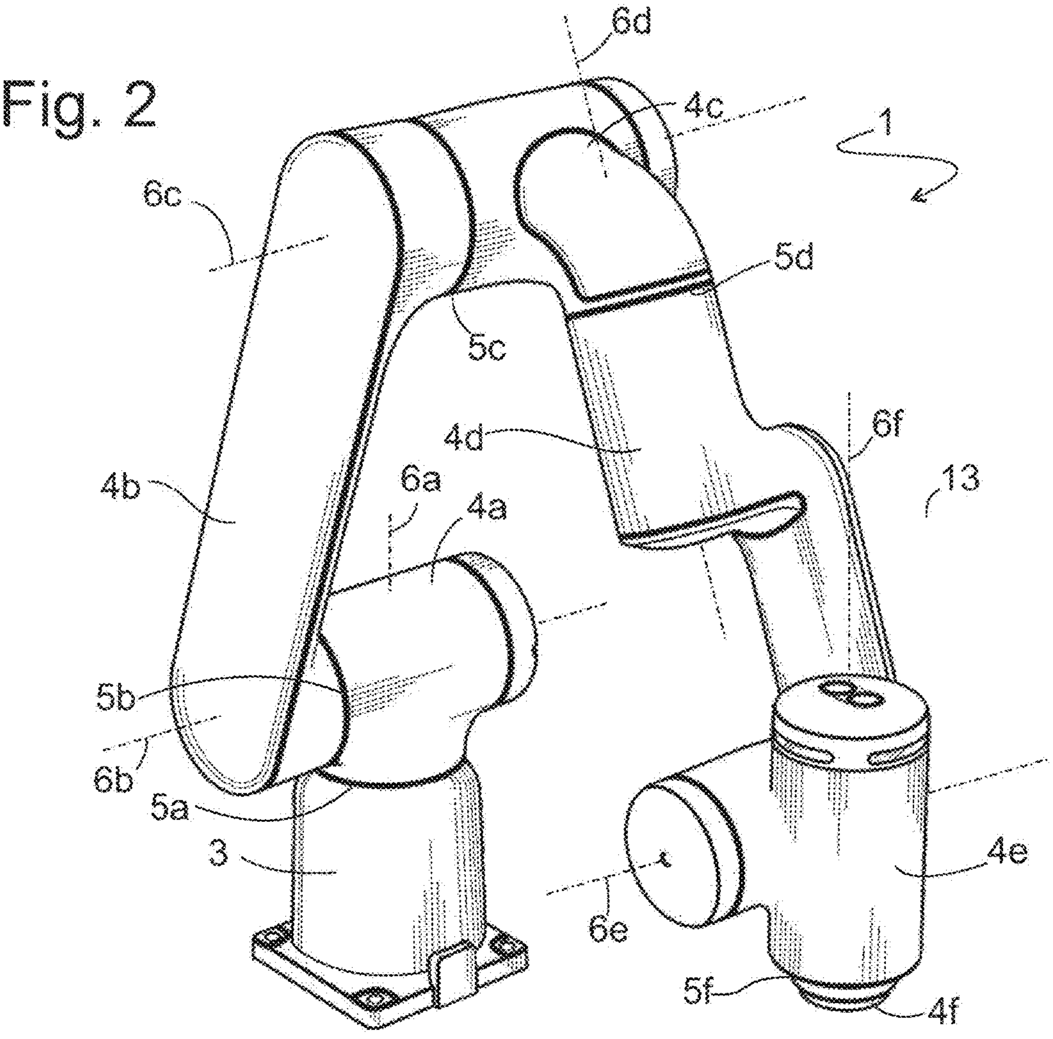
FIG. 2 is a perspective view of the robot arm of the system of FIG. 1.

FIG. 1 is a schematic view of a robot system comprising an articulated robot arm 1 and a controller 2. The robot arm 1, shown in more detail in FIG. 2, has a stationary base 3 fixed to a support, and a plurality of links 4*a*-4*f* rotatably connected to each other and to the base 2 by joints 5*a*-5*f*. The joint 5*e* connecting links 4*d*, 4*e* is concealed behind link 4*e*. Each joint 5*i*, where i=a . . . f, enables a rotation of the link 4*i* on its distal side by an axis 6*i*. The most distal link 4*i* is a holder for a replaceable tool, not shown. Axis 6*a* is vertical, axes 6*b* and 6*c* are horizontal; the orientations of the other axes vary. Each joint 5*i* has a motor associated with it for driving its rotation; the motor can be provided in a member on the proximal side of the joint and be connected to a member on the distal side thereof, or vice versa. In the robot arm of FIG. 2, joints 5*a*, 5*b*, 5*f* have their motors in members on their proximal side, i.e. base 3 and links 4*a*, 4*c*, respectively; joints 4*c*, 4*d* and 4*e* have the motors on their distal side, in links 4*c*, 4*d* and 4*c*, respectively.

Motors 9*b*, 9*c*, 9*d* associated with joints 5*b*, 5*c*, 5*d* and transmission gears 10*b*, 10*c*, 10*d* connecting these motors to links 4*b*, 4*b* and 4*c*, respectively, are shown in FIG. 1.

Typically, the transmission gear 10*j* is a harmonic gear in which a wave generator is rigidly coupled to an output shaft of motor 9*j*, and pressing teeth of a flex-spline into local engagement with a circular spline surrounding it. When the number of teeth of the circular spline is $i_c$ and that of the flex spline is if, the reduction ratio of the gear 10$_j$ is $$R_j = \frac{i_f - i_c}{i_f}.$$

Since the flex-spline is rotating in a direction opposite to that of the wave generator, points of the two currently in contact will meet again after the wave generator has rotated by $2\pi^{i_f}/i_c$. The controller 2 comprises a trajectory generator 11 and, associated with each joint 4*j*, j=a, b . . . f, a position controller and a speed controller, of which only position controllers 12*b*, 12*c*, and speed controllers 13*b* and 13*c* are shown. A trajectory specifies, as a function of time, coordinates a reference point of the robot arm, usually referred to as the tool center point TCP is to have at specified times in the course of a movement the robot is to reproduce. The trajectory generator 11 stores such a trajectory and, when triggered to reproduce it, outputs, at each instant t in time, angle commands to the position controllers 12*j* that specify an angle $$q_{arm\,j}^{target}(t)$$

which, according to the trajectory, should be assumed by their associated joint 5*j* at that instant.

Each position controller 12*j* is connected to a feedback line which conveys a signal representative of the current position or rotation speed of its associated joint 4*j*. The signal can originate from different sources. Conventionally, and as shown in FIG. 1, the source is an angle sensor 7*j*, e.g. a resolver, which is associated with an output shaft of motor 9*j* driving transmission gear 10*j*, and detects a rotation angle $q_{mot\ j}$ of the output shaft.

The position controller 12*j* produces an output signal which is a sum of terms proportional to the difference between a desired current position $$q_{mot\ j}^{target}$$

of the motor derived target from the joint target angle $$q_{arm\ j}^{target}$$

specified by the trajectory generator 11 under the assumption that both are strictly proportional and the actual current motor position $$q_{mot,j}^{*}$$

derived from the signal of feedback line 14*b*, 14*c*. The output signal might be used directly for controlling input power to the motor 9*a*, 9*b*; in the case of FIG. 1 it is input to speed controller 13*b*, 13*c* which compares it to a current joint speed derived from the signal of sensor 7*b*, 7*c*, and controls motor input power based on the difference so that when the target desired current position $$q_{arm,j}^{target}(t)$$

specified by the trajectory generator 11 changes at a constant rate with time t, the position $q_{mot,j}$ of the motor output shaft does so, too.

If the reduction ratio $R_j$ of the transmission gear 10*j* was independent of the motor angle, a current joint angle $$q_{arm,j}^{*}$$

of joint 5*j* could be calculated from a measured value $$q_{mot,j}^{*}$$

of the motor angle using $$q_{armj}^{**} = R_j q_{mot,j}^{*} + q_0$$

($q_0$ being a constant phase angle) with higher precision than it could be measured directly at the joint 5*j* itself. In fact, imperfections of the reduction gear 10*j* cause the reduction ratio $R_j$ to vary slightly as a function of $q_{mot\ j}$.

Another angle sensor 18*j* is associated with an output shaft of the transmission gear 10*j*, so as to obtain measured values $$q_{arm,j}^{*}$$

of the joint angle directly and without any transmission gear in between.

The variation of the reduction ratio $i_j$ is detected from outputs of the sensors 7*j*, 18*j* by forming the difference, also referred to as kinematic error, $$\Delta q_j(q_{mot\ j}) = q_{armj}^{*} - (R_j q_{mot\ j} + q_0) \text{ where } q_{arm,j}^{*}$$

is measured at the same time as $q_{mot,j}$ is output. Alternatively, the variation might be derived from a time shift between the instant in which the joint angle, calculated from the motor angle as $q_{arm,j}=R_j q_{mot,j}+q_0$ reaches a given value and the instant in which this value is actually measured.

Figure 3:
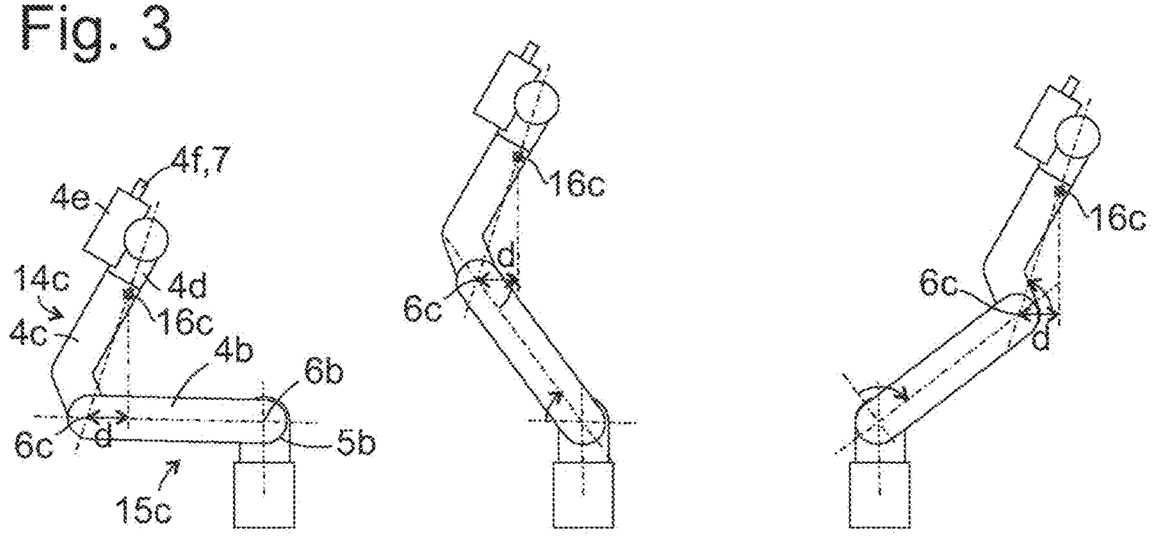
FIG. 3 illustrates steps of a movement for measuring the kinematic error of a first joint of the robot arm of FIG. 2.

FIG. 3 shows poses adopted by the robot arm 1 in the course of a trajectory used for assessing the kinematic error of joint 5*c*. With respect to this joint 5*c*, members 4*c*, 4*d*, 4*c*, 4*f* form a distal portion 14*c*, whereas elements 3, 4*a* and 4*b* form a proximal portion 1Sc of robot arm 1. In the trajectory of FIG. 3, link 4*b* is rotated clockwise around axis 6*b*, whereas the distal portion 14*c* is rotated counterclockwise around axis 6*c* by the same angle. Both axes 6*b*, 6*c* are parallel, so that with respect to a coordinate system in which the base 3 is stationary, the distal portion 14*c* is displaced along a circular path but does not rotate. Thus, a lateral offset d between axis 6*c* and the center of gravity 16*c* of distal portion 14*c* remains constant through the entire trajectory, and so does the torque to which joint 4*c* is subjected while the distal portion 14*c* is being rotated. All other joints 4*a*, 4*d-f* do not rotate throughout the trajectory.

When motor 9*c* is controlled to rotate at a constant speed $\dot{q}_{mot,c}$ too, all spectral components of the kinematic error $\Delta q_c$ at frequencies higher than the fundamental frequency of rotation of the joints Sb, Sc can be regarded as due to speed variations resulting from imperfections of transmission gear 10*c*.

The kinematic error is approximated by a sum of harmonic functions $$\Delta q_c = \sum_{i=1}^{M} A_{i,c} \sin(k_{i,c} q_{motj} + \vartheta_{i,c}) \tag{1a}$$

or $$\Delta q_c = \sum_{i=1}^{M} B_{i,c} \sin(k_{i,c} q_{mot,j}) + C_{i,c} \cos(k_{i,c} q_{mot,j}) \tag{1b}$$

wherein k is either an integer or an integer multiple of $i_j/i_c$.

While controller 2 moves the robot arm 1 as described above, it collects measurements of $\Delta q_c(q_{mot_s})$, and numerically fits the adjustable parameters $A_{i,c}$, $\vartheta_{i,c}$ or $B_{i,c}$, $C_{i,c}$ in equations (1a) or (1b) to these measurements. Typically, the most important contributions to the sums of equations (1a) or (1b) are for $k_1=2^{i_j}/i_c$ and $k_2=2$. In practice, it may therefore be sufficient to perform the fit for these two components alone, or, possibly, one or two more components at higher frequencies $k_3$ or $k_4$.

The adjustable parameters thus obtained are written into a kinematic error (KE) calculator 17*c*, enabling it determine, for any target angle output by trajectory generator 11, the corresponding kinematic error and its time derivative. By superimposing these upon the commands from the trajectory generator, the kinematic error is largely compensated, and the precision with which the displacement of the robot arm 1 is controlled can be improved considerably.

Figure 4:
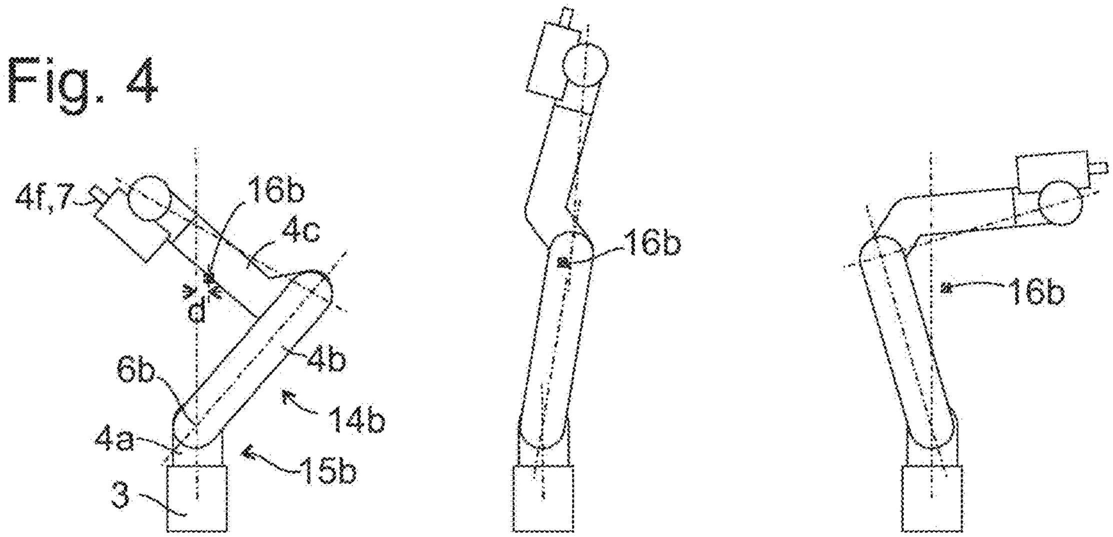
FIG. 4 illustrates steps of a movement for measuring the kinematic error of a second joint of the robot arm of FIG. 2 in a first angle range.

FIG. 4 shows poses adopted by the robot arm 1 in the course of a trajectory used for assessing the kinematic error of joint 5*b*. In this trajectory, link 4*b* is rotated counterclockwise around axis 6*b*. Proximal portion 15*b* is comprises only base 3 and link 4*a*, links 4*b* to 4*f* form distal portion 14*b*. The center of gravity 16*b* of distal portion 14*b* has a small lateral offset d from axis 6*b*. In order to hold the torque acting on joint 5*c* constant, the displacement d must be constant while link 4*b* is rotated. This is achieved by rotating link 4*c* and all other more distal links clockwise around axis 6*c*.

As described above, while the robot arm 1 is moved along the trajectory, the controller collects kinematic error data $\Delta q_b(q_{mot,b})$ from sensors 7*b*, 18*b* in order to assess the kinematic error of joint 5*b*.

Figure 5:
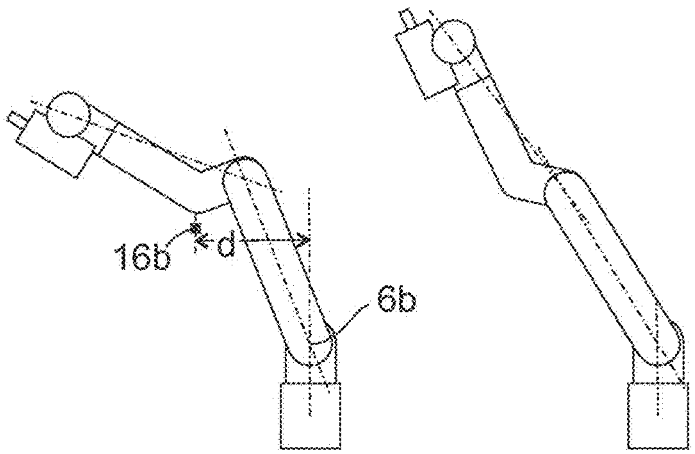
FIG. 5 illustrates steps of a movement for measuring the kinematic error of the second joint in a second angle range.

While in the trajectory of FIG. 3, joint 5*c* can rotate by 180° or even more while holding constant the gravity-induced torque applied by distal portion 14*c*, the angle by which joint 5*b* can rotate under constant torque from distal portion 14*b* is much smaller, approximately 60°, and covers only a fraction of the range in which the joint Sb is actually free to rotate. In order to assess the kinematic error for a wider range of angles, the robot arm 1 can assume poses as shown in FIG. 5: in the left-hand one of these the orientation of link 4*b* is similar to that in the right-hand pose of FIG. 4; links 4*c*-4*f* have been rotated to the left, placing the center of gravity 16*b* to the left of axis 6*b*. Link 4*b* can now continue to rotate counterclockwise, and links 4*c*-4*f* can again rotate clockwise, as shown in the right-hand pose of FIG. 5, again keeping the offset d constant, although at a value different from that of FIG. 4.

It should be noted that the transmission gear 10*b*, 10*c* . . . associated with each joint 5*a-f* of the robot arm 1 has a transmission ratio high enough so that while in the course of a trajectory the joint rotates through an angle range in which the gravity-induced torque acting on it can be held constant, the motor which drives the joint can carry out several complete revolutions. Any imperfections of the motor or of an input side of the transmission gear will take effect on the kinematic error at least once per revolution. So, while the robot arm is moving along the trajectory, the effect of such an imperfection can be observed several times, so that its frequency, phase and amplitude can be determined precisely.

Figure 6:
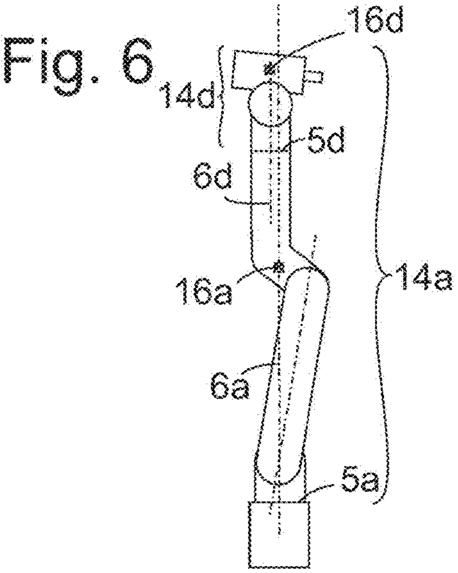
FIG. 6 illustrates a pose of the robot for measuring the kinematic error of the third and fourth joints.

FIG. 6 illustrates a pose of the robot arm 1 in which the center of gravity 16*a* of a distal portion comprising links 4*a-f* of a distal portion comprising links 4*d-f* is located on axis 6*a*. In this pose, the joint 5*a* can be rotated as far as desired, performing a complete revolution or even multiple revolutions. Since the gravity-induced torque acting on the joint 5*a* is constantly zero, any variations of the acceleration measured by sensor 7 while rotating around axis 6*a* can be attributed to imperfections of the transmission gear 10*a* or its associate motor 9*a*, and can be used as described above for assessing the kinematic error of joint 5*a*.

Further, axis 6*d* of joint 5*d* is vertically oriented, and the center of gravity 16*a* of a distal portion comprising links 4*d-f* is located on it, so that in analogy to joint 5*a*, joint 5*d* can be rotated and its kinematic error assessed in this pose.

In a general aspect, the present disclosure describes a method for assessing kinematic error in a joint which rotatably connects a proximal portion and a distal portion of a robot arm, the robot joint having associated with it a motor mounted in one of said portions and coupled to the other one of said portions for driving rotation of the joint by a transmission gear, and a sensor for measuring the rotation of the joint, the method comprising the steps of: (a) determining a movement of the robot arm in which the joint, while being rotated from a start angle to an end angle, is subject to a constant gravity-induced torque; (b) controlling execution of said movement, and, in said movement, controlling the joint to rotate from the start angle to the end angle at a constant speed, (c) detecting speed fluctuations of the joint while it is being rotated from the start angle to the end angle; and (d) estimating the kinematic error based on the speed fluctuations.

By keeping the gravity-induced torque constant, it can be ensured that speed fluctuations are indeed due to imperfections of the gear, or, at least, are not biased by gravity-induced deformation of the robot arm.

Fluctuations may be due to imperfections on the motor side of the transmission gear or on its arm side. When the reduction ratio of the transmission gear is high enough to require several revolutions of the motor for rotating the joint from the start angle to the end angle, the effect of a motor-side imperfection can be observed repeatedly while executing the movement, so that the influence of noise on the estimated kinematic error can be reduced.

While steps b) and c) are preferably carried out by a dedicated electronic controller, this doesn't have to be so for step a). In fact, in most practical cases an appropriate movement can be determined without elaborate optimization.

For example, when the joint in question can have its axis of rotation brought into a vertical orientation, the amount of the torque to which the joint is subjected by the weight of its associated distal portion will not vary during the rotation, provided that internal joints of the distal portion do not move.

The method may therefore comprise a step of bringing the axis of rotation into vertical orientation prior to step b).

Another important special case is where two joints have parallel axes of rotation (or where, in a preparatory step, the axes of two joints are aligned to be parallel). In the description of this special case, the joint referred to above will be called the first joint, and the other the second joint. In that case a rotation speed of the second joint can be matched to that of the first joint so that the gravity-induced torque to which the first joint is subjected is constant throughout the rotation.

Preferably, these axes of rotation are horizontal. When the second joint is in the proximal portion, the gravity-induced torque can be held constant by controlling the rotation of the second joint to be identical in speed but opposite in direction to the rotation of the first joint. When the second joint is in the distal portion, the gravity-induced torque can be held constant by rotating the first and second joints in opposite directions and controlling the speed of the second joint so as to keep constant a lateral displacement between the axis of the first joint and the center of gravity of the distal portion.

Since when the second joint is in the distal portion, the range of angles in which the first joint can be rotated while holding said lateral displacement constant is limited, it can be expedient to carry out step c) at least twice, under different lateral displacements and to base the estimation of step d) on data collected in said multiple steps c).

The speed of rotation should be low enough for torque induced by centrifugal and Coriolis forces to be small compared to gravity induced torque, preferably less than 10% or less than 5% of the gravity induced torque.

According to another aspect of the invention, the object is achieved by a robotic system comprising a robot arm having a proximal portion, a distal portion, a joint connecting said proximal and distal portions, a motor mounted in one of said portions, a transmission gear connecting the motor to the other one of said portions for driving rotation of the joint, a controller for controlling the robot arm to carry out a predetermined movement, wherein the controller is adapted to carry out at least steps b) and c) of the method described above.

Finally, the object is achieved by a computer software product comprising a plurality of instructions which, when executed by a processor, cause the processor to carry out at least steps b) and c) of the above method or to operate as the controller in the above robotic system.

Further features and advantages of the invention will become apparent from the subsequent description of embodiments, referring to the appended drawings.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for assessing kinematic error in a joint that rotatably connects a proximal portion and a distal portion of a robot arm, the joint having associated with it a motor mounted in one of the portions and coupled to the other one of the portions for driving rotation of the joint by a transmission gear having a reduction ratio, and a sensor for measuring the rotation of the joint, the method comprising:

a) determining a movement of the robot arm in which the joint, while being rotated from a start angle to an end angle, is subject to a constant gravity-induced torque;

b) controlling execution of the movement and controlling the joint to rotate from the start angle to the end angle at a constant speed;

c) detecting speed fluctuations of the joint while it is being rotated from the start angle to the end angle; and d) estimating the kinematic error based on the speed fluctuations, wherein the joint is a first joint and the robot arm comprises at least one second joint and the movement is chosen so that at least while rotating the first joint from the start angle to the end angle the first and second joints have parallel axes of rotation, and a rotation speed of the second joint is matched to that of the first joint so that the gravity-induced torque to which the first joint is subjected is constant.

2. The method of claim 1, wherein the sensor is an angle sensor associated with an output shaft of the transmission gear.

3. The method of claim 1, wherein detecting a speed fluctuation comprises determining an angle of an output shaft of the motor, calculating therefrom an expected angle of the joint using the reduction ratio of the transmission gear, and determining a difference between the expected angle and an angle measured by said sensor.

4. The method of claim 1, wherein the reduction ratio of the transmission gear is high enough to require several revolutions of the motor for rotating the joint from the start angle to the end angle.

5. The method of claim 1, wherein the movement is chosen so that at least while rotating from the start angle to the end angle the joint has a vertical axis of rotation.

6. The method of claim 1, wherein the axes of rotation are horizontal.

7. The method of claim 1, wherein the second joint is in the proximal portion and the rotation of the second joint is identical in speed but opposite in direction to the rotation of the first joint.

8. The method of claim 1, wherein the second joint is in the distal portion, the rotation of the second joint is opposite in direction to the rotation of the first joint, and the speed of rotation of the second joint is controlled so as to maintain constant a lateral offset between a center of gravity of the distal portion and an axis of the first joint.

9. A robotic system, comprising:

a robot arm having a proximal portion, a distal portion, a joint connecting said proximal and distal portions, a motor mounted in one of the portions, a transmission gear connecting the motor to the other one of the portions for driving a rotation of the joint;

a controller for controlling the robot arm to carry out a pre-determined movement, wherein the controller is adapted to carry out at least:

controlling execution of the movement and controlling the joint to rotate from a start angle to an end angle at a constant speed; and detecting speed fluctuations of the joint while it is being rotated from the start angle to the end angle, wherein the controller comprises:

a trajectory generator for outputting, based on a predetermined trajectory which maps successive instants in time onto associated desired rotation angles of the joint or its associated motor, at a given instant in time, a position command specifying the desired rotation angle associated with said given instant, and a position controller for adjusting a rotation angle of the joint or the motor to a position command received, wherein the joint is a first joint and the robot arm comprises at least one second joint and the first joint and the second joint have parallel axes of rotation at least while rotating the first joint from the start angle to the end angle, and the controller is configured to match a rotation speed of the second joint to that of the first joint so that a gravity-induced torque to which the first joint is subjected to is constant.

10. The robotic system of claim 9, wherein the robot arm further comprises an angle sensor associated with an output shaft of the transmission gear.

11. The robotic system of claim 9, wherein the controller is adapted to input to the position controller, as said position command, the desired rotation angle corrected by its associated kinematic error.

* * * * *